United States Patent
Khoshnevisan et al.

(10) Patent No.: US 11,323,202 B2
(45) Date of Patent: May 3, 2022

(54) RATE MATCHING FOR MULTI-TRANSMITTER COMMUNICATION

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/947,615

(22) Filed: Aug. 10, 2020

(65) Prior Publication Data

US 2021/0050934 A1 Feb. 18, 2021

Related U.S. Application Data (60) Provisional application No. 62/885,564, filed on Aug. 12, 2019.

(51) Int. Cl.
| | | |
|---|---|---|
| *H04L 1/00* | (2006.01) | |
| *H04B 7/06* | (2006.01) | |
| *H04B 7/26* | (2006.01) | |
| *H04L 27/26* | (2006.01) | |
| *H04L 5/00* | (2006.01) | |

(52) U.S. Cl.
CPC ......... *H04L 1/0013* (2013.01); *H04B 7/0626* (2013.01); *H04B 7/2668* (2013.01); *H04L 5/0048* (2013.01); *H04L 27/2611* (2013.01)

(58) Field of Classification Search
CPC ... H04L 5/0048; H04L 5/005; H04L 27/2611; H05L 5/0051; H04B 7/0621; H04B 7/0626; H04B 7/2665; H04B 7/2668
See application file for complete search history.

(56) References Cited

U.S. PATENT DOCUMENTS

| | | | |
|---|---|---|---|
| 2019/0379506 A1* | 12/2019 | Cheng | H04W 4/02 |
| 2020/0267571 A1 | 8/2020 | Park et al. | |
| 2021/0168030 A1* | 6/2021 | Li | H04L 41/0803 |
| 2021/0235453 A1* | 7/2021 | Matsumura | H04L 5/0035 |

FOREIGN PATENT DOCUMENTS

WO WO-2019066618 A1 4/2019

OTHER PUBLICATIONS

About dynamis resource sharing, Dec. 1, 2017, 3GPP TSG RAN 1 Meeting 91 , pp. 1-4 (Year: 2017).*

(Continued)

*Primary Examiner* — Habte Mered
*Assistant Examiner* — Prince A Mensah
(74) *Attorney, Agent, or Firm* — Harrity & Harrity, LLP (57) ABSTRACT

Various aspects of the present disclosure generally relate to wireless communication. In some aspects, a user equipment may receive configuration information identifying respective rate matching resources of at least two groups and respective transmission configuration indication (TCI) states for the at least two groups. The user equipment may rate match a shared channel transmitted by one or more transmitters based at least in part on the respective rate matching resources and the respective TCI states. Numerous other aspects are provided.

30 Claims, 7 Drawing Sheets

(56) References Cited

OTHER PUBLICATIONS

International Search Report and Written Opinion—PCT/US2020/070397—ISA/EPO—dated Nov. 3, 2020.
Qualcomm Incorporated: "Multi-TRP Enhancements", 3GPP Draft, 3GPP TSG-RAN WG1 Meeting #97, R1-1907289, Multi-TRP Enhancements, 3rd Generation Partnership Project (3GPP), Mobile Competence Centre, 650, Route Des Lucioles, F-06921, Sophia-Antipolis Cedex, France, vol. RAN WG1, No. Reno, Nevada, USA, May 13, 2019-May 17, 2019, May 4, 2019 (May 4, 2019), XP051709312, 25 Pages, Retrieved from the Internet: URL: http://www.3gpp.org/ftp/tsg%5Fran/WG1%5FRL1/TSGR1%5F97/Docs/R1%2D1907289%2Ezip [retrieved on May 4, 2019] pp. 4-6, 3.1 POSCH and PDCCH Related Enhancements pp. 6-7, 3.1.1 UE Capability Framework for Multi-TRP pp. 7-8, 3.2.1 Joint HARQ-Ack Payload I Feedback p. 7, figure 1, sections 1-3, Introduction Agreement, p. 5, Agreement, Section 3.1.1, p. 6, Section 3.2, Section 3.2.1, p. 7.

Spreadtrum Communications: "Discussion on Multi-TRP Transmission", 3GPP Draft, 3GPP TSG RAN WG1 Meeting #97, R1-1906369, Discussion on Multi-TRP Transmission, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051727819, 8 pages, Retrieved from the Internet : URL: http://www.3gpp.org/ftp/Meetings%5F3GPP%5FSYNC/RAN1/Docs/R1%2D1906369%2Ezip. [retrieved on May 13, 2019] p. 5-p. 6.
VIVO: "Further Discussion on Multi-TRP Transmission, "3GPP Draft, 3GPP TSG RAN WG1 #96bis, R1-1905817, Further Discussion on Multi-TRP Transmission, 3rd Generation Partnership Project (3GPP), Mobile Competence Centre, 650, Route Des Lucioles, F-06921, Sophia-Antipolis Cedex, France, vol. RAN WG1. No. Xi 'an. China; Apr. 8, 2019-Apr. 12, 2019, Apr. 15, 2019 (Apr. 15, 2019), XP051707864, 14 pages, Retrieved from the Internet:URL: http://www.3gpp.org/ftp/tsg%5Fran/WG1%5FRL1/TSGR1%5F96b/Docs/R1%2D1905817%2Ezip [retrieved on Apr. 15, 2019], section 5.

* cited by examiner

RATE MATCHING FOR MULTI-TRANSMITTER COMMUNICATION

CROSS-REFERENCE TO RELATED APPLICATION

This patent application claims priority to U.S. Provisional Patent Application No. 62/885,564, filed on Aug. 12, 2019, entitled "RATE MATCHING FOR MULTI-TRP COMMUNICATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for rate matching for multi-transmitter communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving configuration information identifying respective rate matching resources of at least two groups and respective TCI states for the at least two groups; and rate matching a shared channel transmitted by one or more transmitters based at least in part on the respective rate matching resources and the respective TCI states.

In some aspects, a UE for wireless communication may include memory and one or more processors operatively coupled to the memory. The memory and the one or more processors may be configured to receive configuration information identifying respective rate matching resources of at least two groups and respective TCI states for the at least two groups; and rate match a shared channel transmitted by one or more transmitters based at least in part on the respective rate matching resources and the respective TCI states.

In some aspects, a non-transitory computer-readable medium may store one or more instructions for wireless communication. The one or more instructions, when executed by one or more processors of a UE, may cause the one or more processors to: receive configuration information identifying respective rate matching resources of at least two groups and respective TCI states for the at least two groups; and rate match a shared channel transmitted by one or more transmitters based at least in part on the respective rate matching resources and the respective TCI states.

In some aspects, an apparatus for wireless communication may include means for receiving configuration information identifying respective rate matching resources of at least two groups and respective TCI states for the at least two groups; and means for rate matching a shared channel transmitted by one or more transmitters based at least in part on the respective rate matching resources and the respective TCI states.

Aspects generally include a method, apparatus, system, computer program product, non-transitory computer-readable medium, user equipment, base station, wireless communication device, transmit receive point, and/or processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
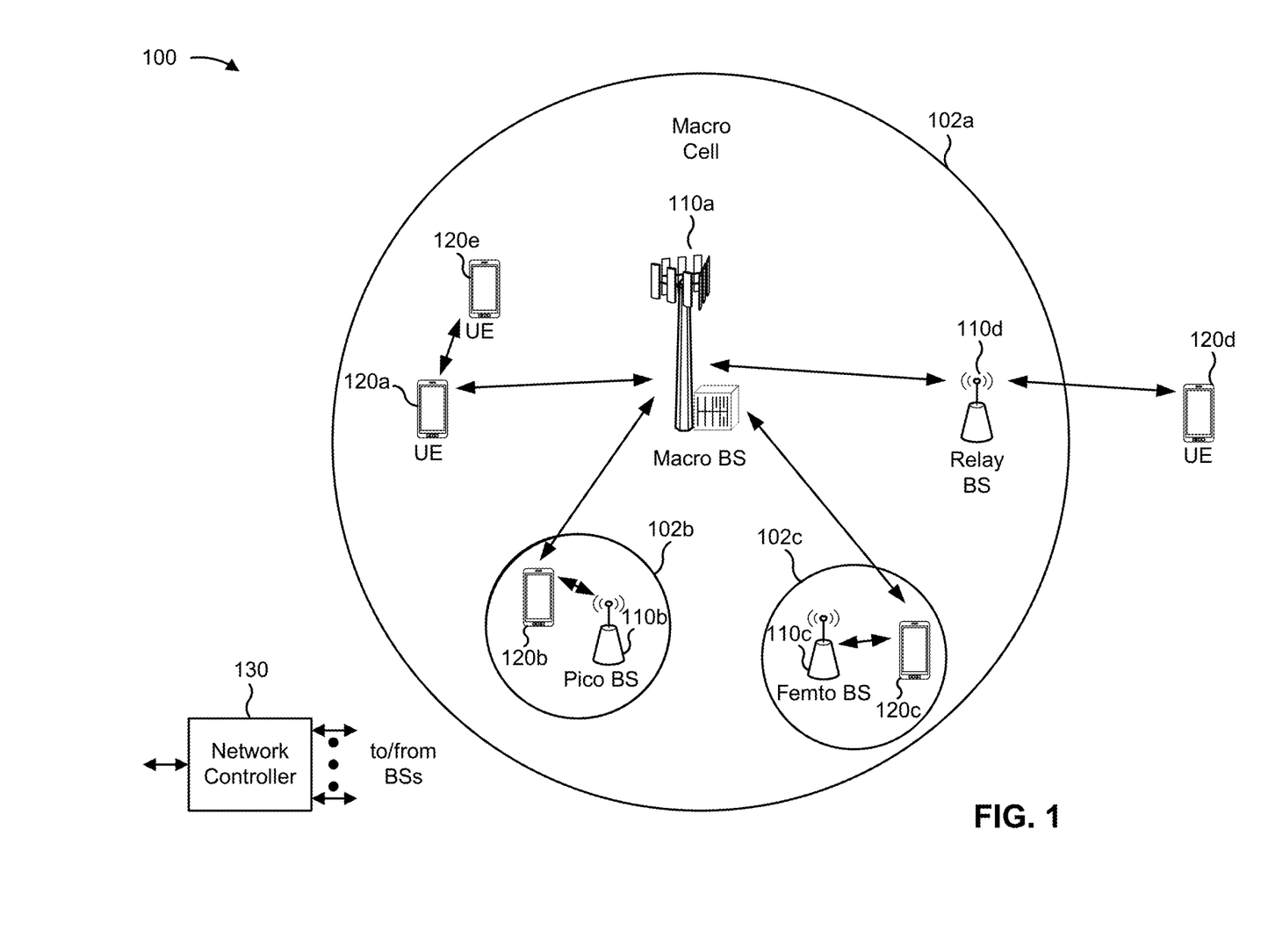
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
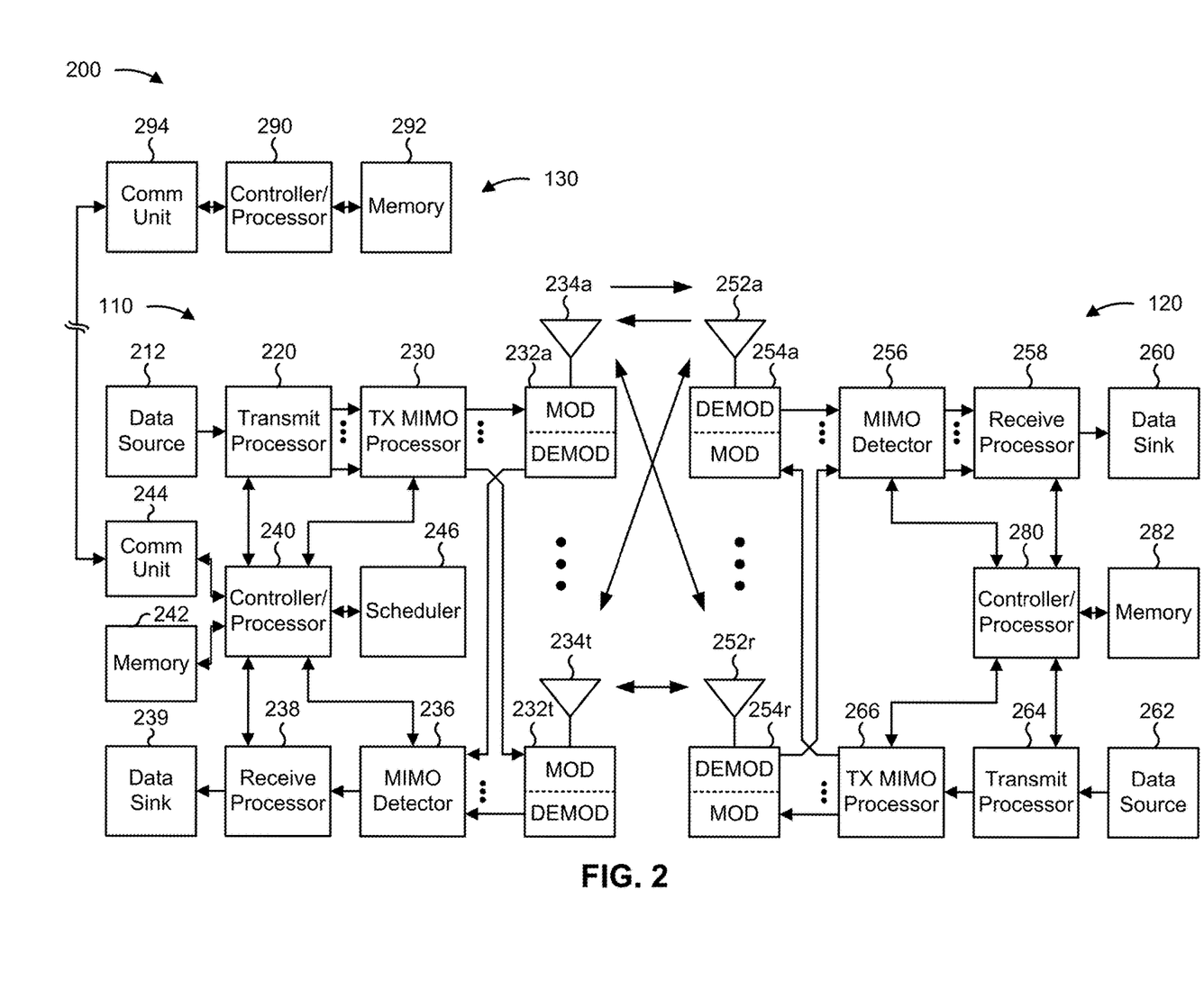
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with rate matching for multi-TRP communication, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7 and/or other processes as described herein. A scheduler 246 may schedule UEs for data transmission on the downlink and/or uplink.

In some aspects, UE 120 may include means for receiving configuration information identifying respective rate matching resources of at least two groups and respective transmission configuration indication (TCI) states for the at least two groups; means for rate matching a shared channel transmitted by one or more transmitters based at least in part on the respective rate matching resources and the respective TCI states; means for receiving information indicating a single TCI state, of the respective TCI states, for the shared channel; means for rate matching the shared channel in accordance with the single TCI state and based at least in part on rate matching resources, of the respective rate matching resources, corresponding to a transmitter, of the one or more transmitters, associated with the single TCI state; means for receiving downlink control information indicating the respective selected TCI states, wherein the respective selected TCI states are selected from the respective TCI states associated with at least one corresponding group, of the at least two groups, corresponding to the at least two transmitters; means for rate matching the shared channel around all rate matching resources, of the respective rate matching resources, included in the at least one corresponding group associated with the at least two transmitters; means for rate matching the shared channel around the respective rate matching resources corresponding to respective TRPs associated with the at least two transmitters, wherein the rate matching is performed separately for each of the at least two transmitters; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In a wireless network, a UE may be communicatively connected to a plurality of TRPs, which may be referred to a multi-TRP configuration. The UE may transmit communications to, and/or receive communications from, the plurality of TRPs. Additionally, or alternatively, the UE may communicate with multiple antenna panels or subpanels of a TRP in the multi-TRP configuration. Thus, the multiple TRPs or multiple antenna panels or subpanels of a TRP are referred to herein as transmitters.

Multiple transmitters may transmit the same data (e.g., the same shared channel, such as the same physical downlink shared channel (PDSCH) and/or the like) to a UE. In such a case, a single downlink control information (DCI) communication, such as a single control channel, may be used to schedule the data from the multiple transmitters. In such a case, the single DCI may convey control information for each of the multiple transmitters. For example, the control information may include one or more fields that specify one or more (or multi-panel) parameters for the multi-TRP configuration, such as a TCI field that indicates a TCI state (which may indicate one or more quasi-colocation (QCL) relationships associated with the plurality of TRPs), a demodulation reference signal (DMRS) port field (which may indicate one or more DMRS ports associated with the plurality of TRPs), and/or the like.

In some cases, a multi-TRP transmission may use two or more different TCI states, corresponding to two or more different TRPs that transmit or receive the multi-TRP transmission. In other cases, the multi-TRP transmission may use a single TCI state, corresponding to at least two transmitters of a single TRP. Dynamic switching between multi-TCI-state (i.e., multi-TRP) transmission and single-TCI-state transmission may be implemented using the DCI. For example, if the TCI field of the DCI points to a single TCI state, then single-TCI-state transmission may be used, and if the TCI field points to two or more different TCI states, then multi-TCI-state transmission may be used.

In some aspects, a TRP may configure rate matching resources for a shared channel. If the shared channel overlaps a rate matching resource, the shared channel may be rate matched around the rate matching resource. In other words, a rate matching resource may be unavailable for data. Rate matching may be configured periodically or semi-persistently (e.g., using radio resource control (RRC) signaling) or aperiodically (e.g., using DCI). In the case of multi-TRP communication, the availability of resources and the rate matching resource configurations may be different for different TRPs, such as due to different control resource set configurations, different search space configurations, different synchronization signal block transmissions, different cell-specific reference signal (CRS) resource configurations (e.g., LTE CRS and/or the like), different channel state information reference signal resource configurations, and/or the like.

However, dynamic switching between single-TCI-state and multi-TCI-state transmission of a shared channel may lead to ambiguity in rate matching. For example, the usage of different rate matching resources for different TRPs, and the differences in configuration between different TRPs, may mean that the specific rate matching resources to be used for rate matching of a multi-TRP shared channel may be ambiguous. This ambiguity may lead to incorrect or suboptimal rate matching and/or interference between TRPs.

Some techniques and apparatuses described herein provide configuration of rate matching resources and TCI states per TRP, and rate matching techniques for multi-transmitter (e.g., multi-TCI-state or single-TCI-state) transmissions. By configuring the rate matching resources and the TCI states per TRP (e.g., per group, where each group corresponds to a TRP), ambiguity for multi-TRP and multi-transmitter communications is reduced. Furthermore, rate matching efficiency is improved and interference is reduced by providing rules for identifying rate matching resources for multi-TRP communications and multi-transmitter communications.

Figure 3:
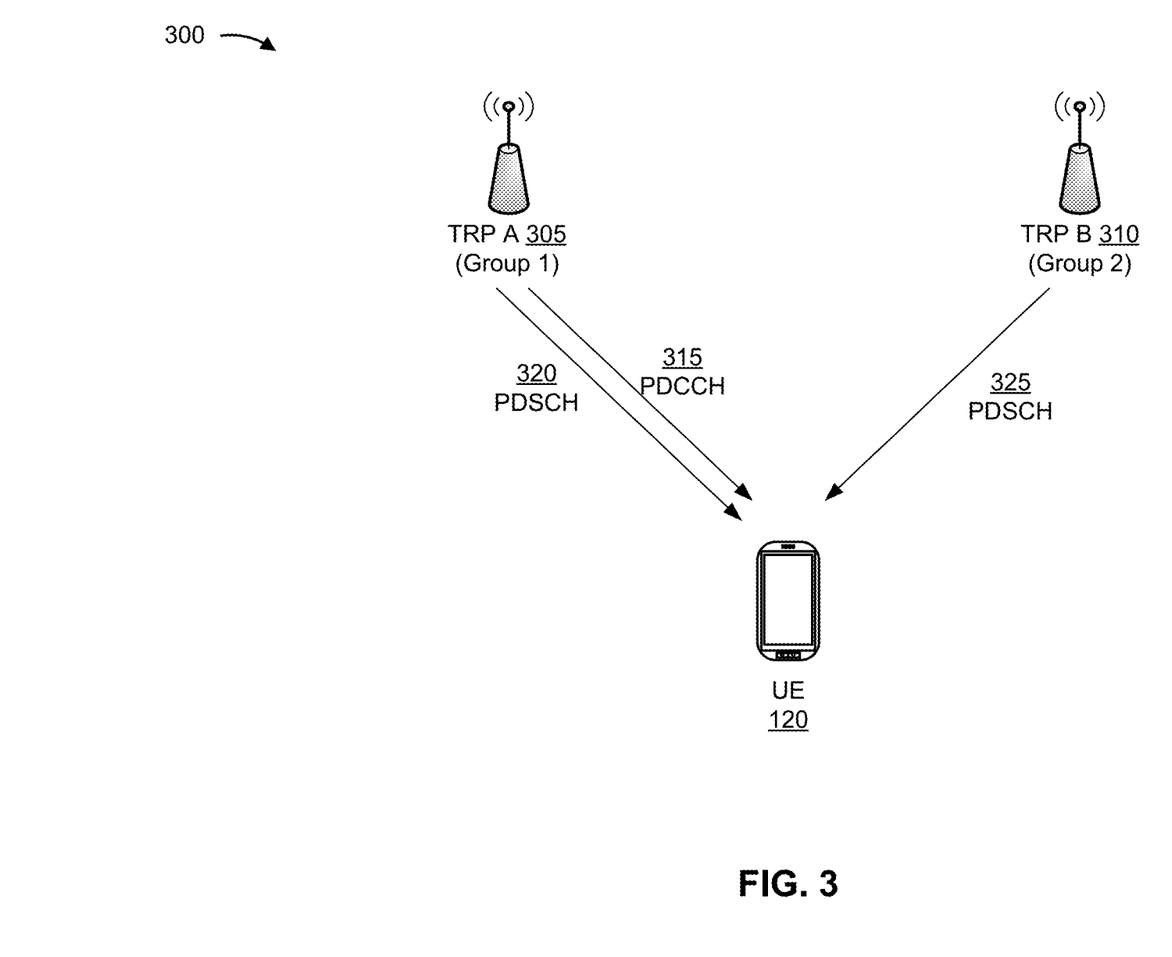
FIG. 3 is a diagram illustrating an example of multi-transmitter communication using a single control channel, in accordance with various aspects of the present disclosure.

FIG. 3 is a diagram illustrating an example 300 of multi-TRP communication using a single control channel, in accordance with various aspects of the present disclosure. As shown, example 300 includes a UE 120, a TRP A 305 (referred to hereinafter as TRP A), and a TRP B 310 (referred to hereinafter as TRP B). As further shown, TRP A is associated with a first group and TRP B is associated with a second group. The groups may be used to configure relationships between the TRPs and corresponding rate matching resources and TCI states, which may provide for rate matching for dynamic multi-TRP communication, as described below in connection with FIG. 5.

As shown by reference number 315, TRP A may provide a physical downlink control channel (PDCCH). For example, the PDCCH may include DCI that identifies resources for a shared channel to be transmitted by TRP A and TRP B. In some aspects, the DCI may include a TCI field that indicates one or more TCI states. When the TCI field indicates a single TCI state, TRP A or TRP B may perform single-TRP transmission using a single TCI state. When the TCI field indicates two or more TCI states, TRP A and/or TRP B may perform transmission using multiple TCI states (e.g., from a single TRP or from both of TRP A and TRP B). The shared channel is shown by reference numbers 320 and 325. In some aspects, the shared channel shown by reference number 320 may be the same as the shared channel shown by reference number 325. In some aspects, the shared channel may be split between TRP A and TRP B, or TRP A and TRP B may transmit different versions of the shared channel.

As indicated above, FIG. 3 is provided as an example. Other examples may differ from what is described with respect to FIG. 3.

Figure 4:
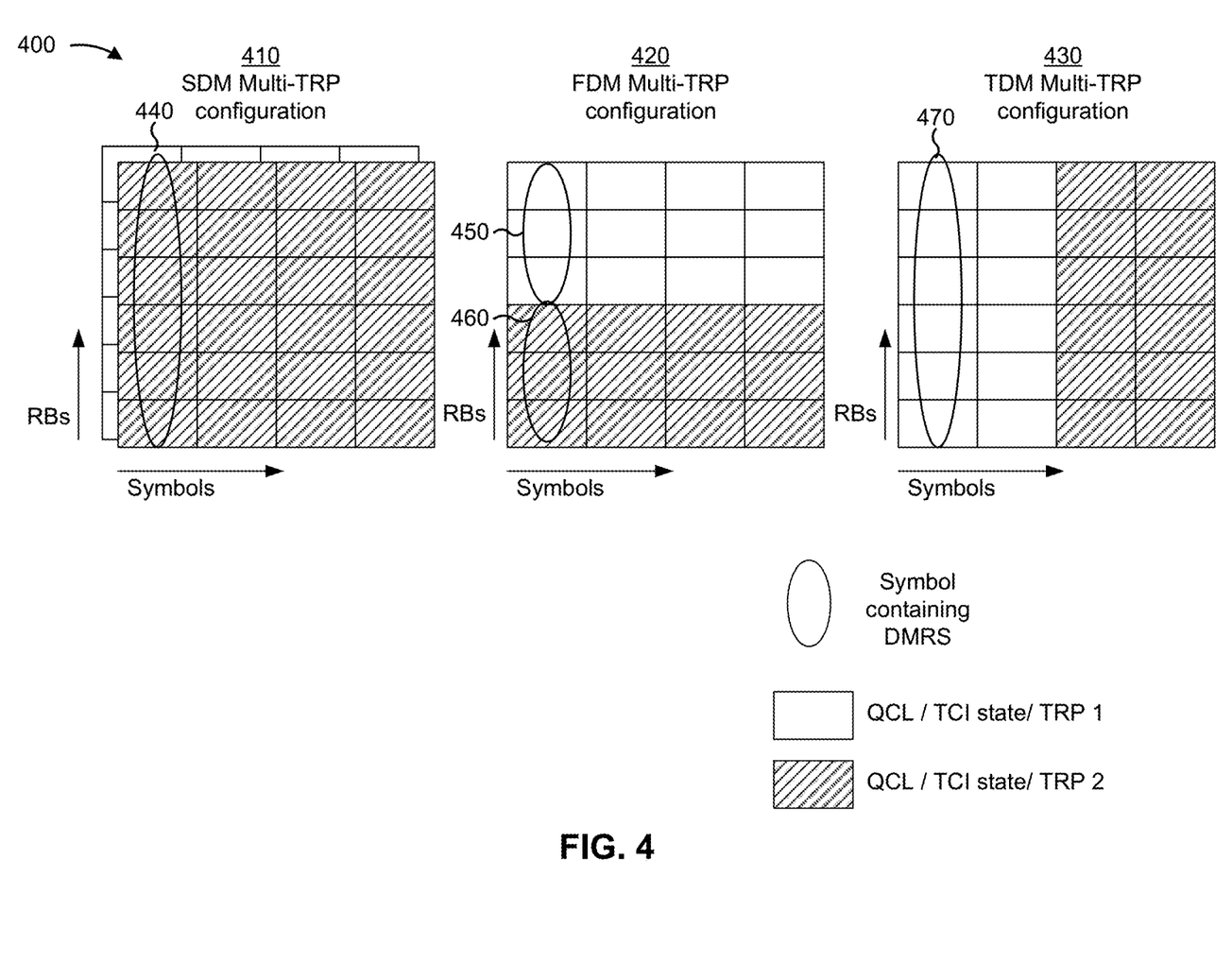
FIG. 4 is a diagram illustrating an example of resources for multi-transmitter communication using a single control channel, in accordance with various aspects of the present disclosure.

FIG. 4 is a diagram illustrating an example 400 of multi-TRP communication schemes, in accordance with various aspects of the present disclosure. Example 400 shows a spatial division multiplexing (SDM) scheme 410, a frequency division multiplexing (FDM) scheme 420, and a time division multiplexing (TDM) scheme 430. As shown, the vertical axis represents frequency (e.g., resource blocks (RBs)) and the horizontal axis represents time (e.g., symbols such as OFDM symbols). A time/frequency resource associated with a first QCL state, corresponding to a first TCI state associated with TRP 1 (e.g., the first group), is indicated by a white fill, and a time/frequency resource associated with a second QCL state, corresponding to a second TCI state associated with TRP 2 (e.g., the second group) is shown by a diagonal fill. Symbols containing a DMRS are indicated by ovals 440, 450, 460, and 470.

In the SDM scheme 410, different TRPs may transmit different spatial layers in overlapping time/frequency resources (e.g., overlapping RBs/symbols). In such a case, the different spatial layers may be transmitted with different TCI states since the different spatial layers are transmitted by different TRPs. In some aspects, for four layers or fewer, all layers may correspond to a single codeword and/or transport block (TB). In some aspects, for more than 4 layers, different layers can correspond to different codewords or TBs.

In the FDM scheme 420, different sets of RBs are transmitted by the different TRPs using different TCI states. For example, in a first FDM scheme, one codeword may be transmitted in both sets of RBs. In a second FDM scheme, two codewords of the same TB may be transmitted (e.g., one in each set of RBs).

In the TDM scheme 430, different sets of symbols (e.g., different mini-slots or slots) may be transmitted with different TCI states. In this case, each repetition may be referred to as a transmission occasion. Different codewords of the same TB may be transmitted in different transmission occasions.

As indicated above, FIG. 4 is provided as an example. Other examples may differ from what is described with respect to FIG. 4.

Figure 5:
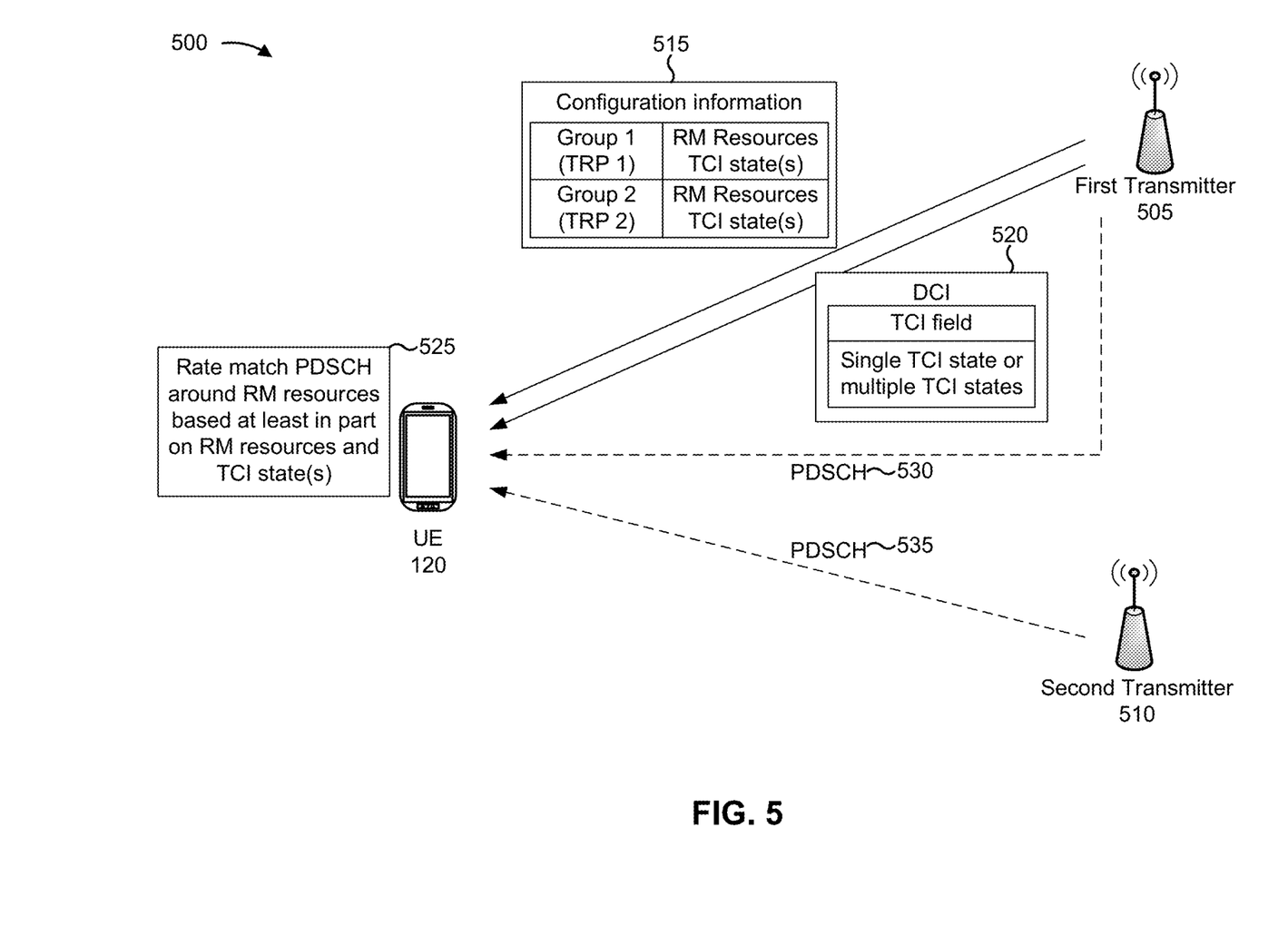
FIG. 5 is a diagram illustrating an example of rate matching for multi-transmitter communication using a single control channel, in accordance with various aspects of the present disclosure.

FIG. 5 is a diagram illustrating an example 500 of rate matching for multi-TRP communication using a single control channel, in accordance with various aspects of the present disclosure. As shown, example 500 includes a UE 120, a first transmitter 505 (e.g., TRP 305/310 or an antenna panel or subpanel of TRP 305/310), and a second transmitter 510 (e.g., TRP 305/310 or an antenna panel or subpanel of TRP 305/310). In some aspects, the first transmitter 505 and the second transmitter 510 may be different antenna panels or subpanels of a single TRP. In some aspects, the first transmitter 505 and the second transmitter 510 may be different TRPs.

As shown in FIG. 5, the UE 120 may receive configuration information 515. Here, the UE 120 receives the configuration information 515 from the first transmitter 505, though the UE 120 may receive the configuration information 515 from any device (e.g., BS 110, network controller 130, second transmitter 510, and/or the like). In some aspects, the configuration information 515 may be provided using radio resource control (RRC) signaling and/or the like.

As shown, the configuration information 515 may include information identifying TCI states, rate matching (RM) resources, and/or groups (e.g., TRPs) associated with the TCI states and RM resources. A TCI state may indicate a reference signal set for one or more QCL types. For example, the reference signal set may include a synchronization signal block (SSB), a channel state information reference signal (CSI-RS) (e.g., an aperiodic CSI-RS, a periodic CSI-RS, a semi-persistent CSI-RS, and/or the like), a tracking reference signal, and/or the like. The UE 120 may be configured with any number of TCI states. In some aspects, the UE 120 may receive information (e.g., a medium access control element (MAC-CE) and/or the like) indicating a set of active TCI states to be used for shared channel QCL indication. A set of bits in DCI (described below) may indicate a TCI state, of the set of active TCI states, for a shared channel transmission. When a single DCI is used to schedule a multi-TCI-state transmission, a TCI field of the DCI may indicate 2 TCI states for receiving the transmission. In such a case, the TCI field may point to two QCL relationships, corresponding to two reference signal (RS) sets. Furthermore, the UE 120 may dynamically switch between multi-transmitter and single-transmitter transmission based at least in part on how many TCI state pointers are in the TCI field.

As shown, the configuration information 515 may identify a plurality of groups. Each group may be associated with a TRP. Here, Group 1 is associated with a TRP 1 and Group 2 is associated with a TRP 2. Each group may be associated with one or more TCI states. For example, Group 1 may be associated with one or more first TCI states and Group 2 may be associated with one or more second TCI states. In some aspects, each TCI state may be associated with one of X TRPs (e.g., based at least in part on a TRP identifier included in the configuration information). For example, for X=2, the UE 120 may be configured with 64 beams (e.g., 64 TCI states) corresponding to TRP 1 and 64 beams corresponding to TRP 2. In some aspects, the configuration information may not identify a group, or all RM resources may be associated with the same group.

Each group may be associated with respective RM resources. For example, a TRP associated with Group 1 may be associated with a first set of RM resources and a TRP associated with Group 2 may be associated with a second set of RM resources. In some aspects, an RM resource may be associated with both of Group 1 and Group 2. In other words, the RM resources of Group 1 and Group 2 may at least partially overlap each other, or may not overlap each other.

An RM resource may include a resource that is unavailable for a data transmission (e.g., a shared channel transmission and/or the like) by the corresponding TRP (e.g., group). For example, an RM resource associated with Group 1 may be unavailable for transmission of a PDSCH by TRP 1. RM resources may be associated with an RM resource type, such as a zero-power (ZP) CSI-RS resource set, a periodic rate matching pattern, an SSB, a CRS corresponding to transmission of a signal associated with a different radio access technology (e.g., LTE and/or the like) than the shared channel, a reference signal around which rate matching is to be performed, a rate matching pattern group (e.g., associated with an aperiodic rate matching configuration), a zero-power CSI-RS resource, and/or the like.

For a periodic or semi-persistent rate matching configuration, the RM resources may be configured using RRC signaling, and, in the case of the semi-persistent rate matching configuration, may be activated using a MAC-CE. For an aperiodic rate matching configuration, the RM resources may be indicated through DCI dynamically using a rate matching indicator field, a ZP CSI-RS trigger, and/or the like. In such a case, two groups of resource sets (e.g., rate matching pattern groups) may be configured, and DCI may indicate whether each group of the resource sets is not available for data (e.g., using a "Rate matching indicator" field). Furthermore, different ZP CSI-RS resource sets may be configured, and the DCI may indicate which of the ZP CSI-RS resource sets are not available for data (e.g., using a "ZP CSI-RS trigger" field).

By associating TCI states with corresponding groups and RM resources, the UE 120 may determine which RM resources are to be used for a particular shared channel transmission based at least in part on which TCI states are used for the particular shared channel transmission. This reduces ambiguity in rate matching, particularly for TRPs associated with different RM resources, reduces collision between shared channels and rate matched resources, and is described in more detail below.

As shown by reference number 520, the UE 120 may receive DCI (e.g., in a PDCCH and/or the like). Here, the DCI is shown as provided by the first transmitter 505, though the DCI may be provided by any device or function. As shown, the DCI includes a TCI field. As further shown, the TCI field indicates a single TCI state or multiple TCI states. For example, the TCI field may indicate one or more of the TCI states configured by the configuration information 515. In some aspects, the TCI field indicates a single TCI state, corresponding to a single beam transmitted by a single TRP. In some aspects, the TCI field indicates two or more TCI states, corresponding to respective beams transmitted by one or more TRPs. For example, if the two or more TCI states are in a single group, then the two or more TCI states may correspond to respective beams generated by respective antenna panels of a single TRP. If the two or more TCI states are in different groups, then the two or more TCI states may correspond to respective beams generated by TRPs corresponding to the different groups. The UE 120 may identify which RM resources, of the RM resources associated with the one or more TCI states indicated by the DCI, are to be rate matched around, as described in more detail in connection with reference number 525.

As shown by reference number 525, the UE 120 may rate match the PDSCH (shown by reference numbers 530 and 535) around one or more RM resources based at least in part on the RM resources and based at least in part on the one or more TCI states indicated by the DCI. Approaches for determining which RM resources are to be rate matched around are described below.

In some aspects, the UE 120 may rate match around the union of all RM resources across all TRPs indicated by the configuration information. For example, the UE 120 may rate match around the RM resources associated with Group 1 and Group 2 irrespective of whether the TCI field indicates TCI states associated with Group 1 and/or Group 2. More particularly, if Group 1 is associated with RM resources A and C, and if Group 2 is associated with RM resources B and F, then the UE 120 may rate match around RM resources A, B, C, and F, irrespective of whether the DCI points to TCI states associated with only Group 1, only Group 2, or Groups 1 and 2. In some aspects, the UE 120 may, for a particular rate matching resource type, rate match around all rate matching resources of the respective rate matching resources of the particular rate matching resource type of all the configured groups. For example, for a ZP-CSI-RS resource type, the UE 120 may rate match around ZP-CSI-RSs of all the configured groups.

In some aspects, the UE 120 may select RM resources to rate match around based at least in part on which TCI states are indicated by the DCI. For example, the one or more TCI states may indicate which RM resources are to be rate matched around based at least in part on the configuration information. In this case, for aperiodic rate matching, the interpretation of the DCI fields "Rate matching indicator" and "ZP CSI-RS trigger" may be based at least in part on the TCI states indicated by the DCI. Various examples of selecting RM resources to rate match around based at least in part on which TCI states are indicated by the DCI are provided below.

In some aspects, the UE 120 may select the RM resources as the union of RM resources corresponding to one or more groups associated with the one or more TCI states indicated by the DCI. For example, if the shared channel is associated with a single TCI state (e.g., if a TCI field of the DCI points to a single TCI state), then the UE 120 may use rate matching resources corresponding to a group corresponding to the single TCI state. If the shared channel is associated with two TCI states (e.g., if the TCI field points to two TCI states) that are associated with a same TRP (e.g., have a same TRP/group identifier in the configuration information), then the UE 120 may rate match around RM resources of the group associated with the same TRP. If the shared channel is associated with two TCI states that are associated with different TRPs, then the UE 120 may rate match around the union of the resources of the different TRPs. Rate matching around a union of RM resources of all the groups associated with the TCI state(s), may reduce complexity and simplify UE implementation.

In some aspects, the UE 120 may rate match around RM resources of different TRPs separately. For example, if a DCI indicates TCI states associated with TRP 1 and TRP 2, the UE 120 may rate match the data channel transmitted by TRP 1 in accordance with the RM resources of TRP 1, and may rate match the data channel transmitted by TRP 2 in accordance with the RM resources of TRP 2. If a DCI indicates TCI states associated with only TRP 1, then the UE 120 may rate match the data channel in accordance with the RM resources of TRP 1, and so on.

As an example of separate rate matching for the SDM scheme, spatial layers transmitted with a first TCI state and a second TCI state corresponding to different TRPs (e.g., TRP 1 and TRP 2) may be rate matched around the RM resources configured for the corresponding TRP 1 and TRP 2, respectively. Separate rate matching in the TDM scheme may be similar to the approach described above. For example, OFDM symbol sets transmitted with the first TCI state and the second TCI state may be rate matched around the RM resources configured for TRP 1 and TRP 2.

Figure 6:
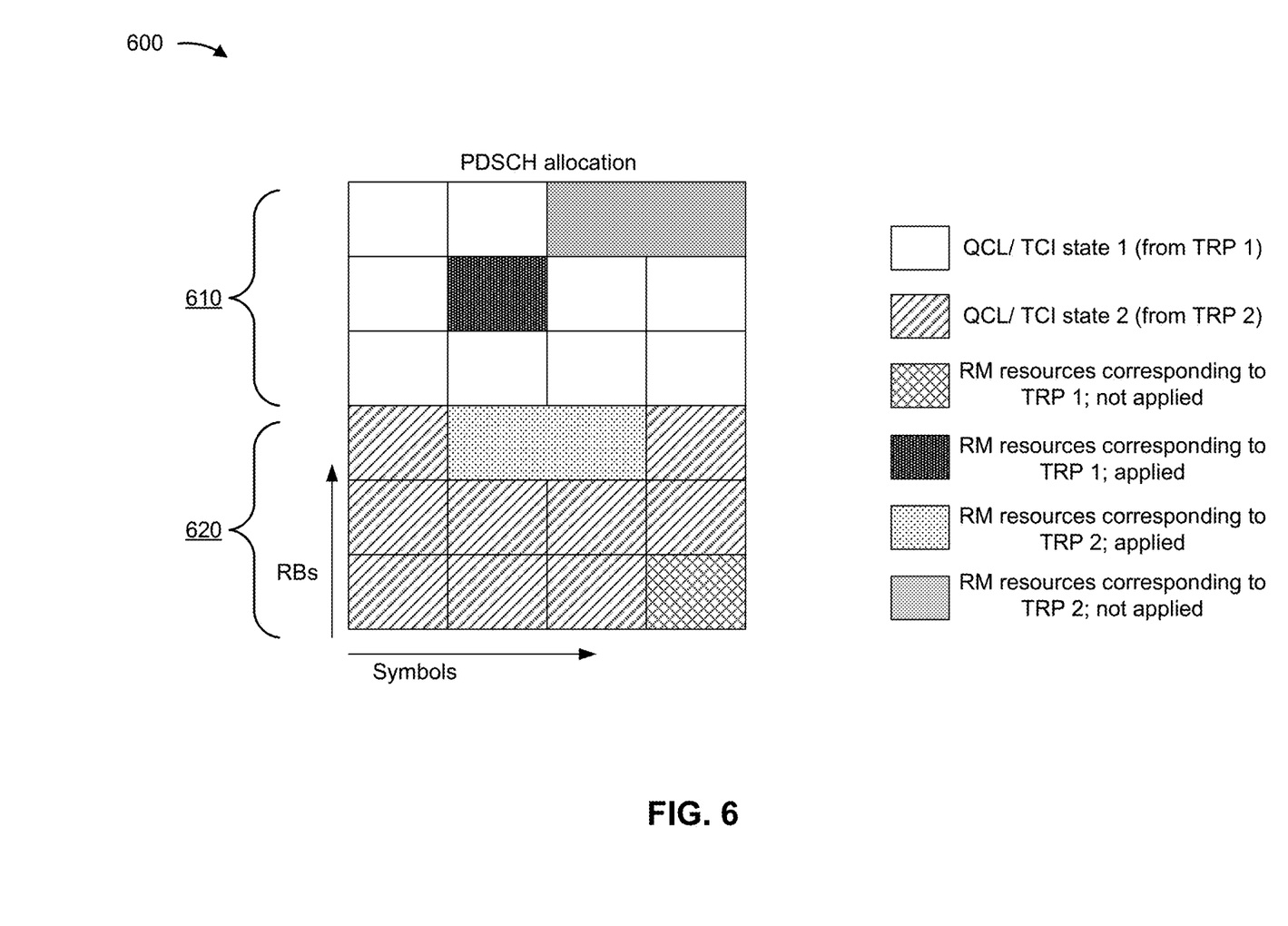
FIG. 6 is a diagram illustrating an example of rate matching for two transmitters in a frequency division multiplexing scheme, in accordance with various aspects of the present disclosure.

For an example of separate rate matching for the FDM scheme, refer to FIG. 6. FIG. 6 is a diagram illustrating an example 600 of rate matching for two TRPs in an FDM scheme, in accordance with various aspects of the present disclosure. The top half 610 of the time/frequency grid corresponds to a shared channel transmitted by TRP 1, and the bottom half 620 of the time/frequency grid corresponds to a shared channel transmitted by TRP 2. As shown in FIG. 6, non-rate-matched resources of TRP 1 are shown by white fill and non-rate-matched resources of TRP 2 are shown by diagonal fill. Each TRP may be configured with RM resources in an entirety of the time/frequency grid, although only half of the time/frequency grid is used by each TRP for the multi-TRP transmission of the shared channel. For example, RM resources corresponding to TRP 1 are shown by the diamond hatching and the white-dots-on-black-background fill, and RM resources corresponding to TRP 2 are shown by the black dotted fill and the gray fill.

As shown, if configured RM resources corresponding to TRP 1 are transmitted by TRP 2 using the TCI state of TRP 2 (e.g., the resources shown by the diamond fill), then the UE 120 may not rate match around these RM resources. Similarly, if RM resources corresponding to TRP 2 (e.g., the resources shown by the gray fill) are transmitted by TRP 1, then the UE 120 may not rate match around these RM resources. Thus, interruption of the shared channel is reduced relative to rate matching around a union of all RM resources.

In some aspects, the UE 120 may perform encoding or decoding of the shared channel based at least in part on the RM resources. For example, a total number of coded bits available for transmission of a TB may be denoted by G. G value may be used for encoding and decoding (e.g., based at least in part on how many bits (E) are to be read from the circular buffer for each CB of a TB). Encoding/decoding schemes for SDM, TDM, and FDM schemes are described in more detail below.

For the SDM scheme, when the shared channel includes one codeword, different resource elements (REs) can have different numbers of layers. For example, layers coming from TRP 1 (N_L1) in a given RE/RB may be rate matched around while layers coming from TRP 2 (N_L2) in the same RE/RB may carry data. Thus, for calculating G and E, different numbers of layers may be used for different RE/RBs. In just one example, calculating G and E can be performed based at least in part on the following rules:

- If the UE 120 only rate matches around the RM resources for TRP 1, then use N_L2 layers for an RE/RB.
- If the UE 120 only rate matches around the RM resources for TRP 2, then use N_L1 layers for an RE/RB.
- If the UE does not rate match around RM resources of TRP 1 or TRP 2 for an RE/RB, then use N_L1+N_L2 layers for the RE/RB.
- If two codewords are transmitted from different TRPs, then G and E may be calculated per codeword separately, taking into account RM resources of the corresponding TRP.

For the FDM scheme and the TDM scheme, if different codewords are transmitted by the TRPs, G and E may be calculated per codeword separately, taking into account RM resources of the corresponding TRP. For the FDM scheme when a same codeword is transmitted by the TRPs, G and E may be calculated by taking into account the RBs/REs not available for data jointly for both TRPs (e.g., as the union of such RBs/REs).

As indicated above, FIGS. 5 and 6 are provided as examples. Other examples may differ from what is described with respect to FIGS. 5 and 6.

Figure 7:
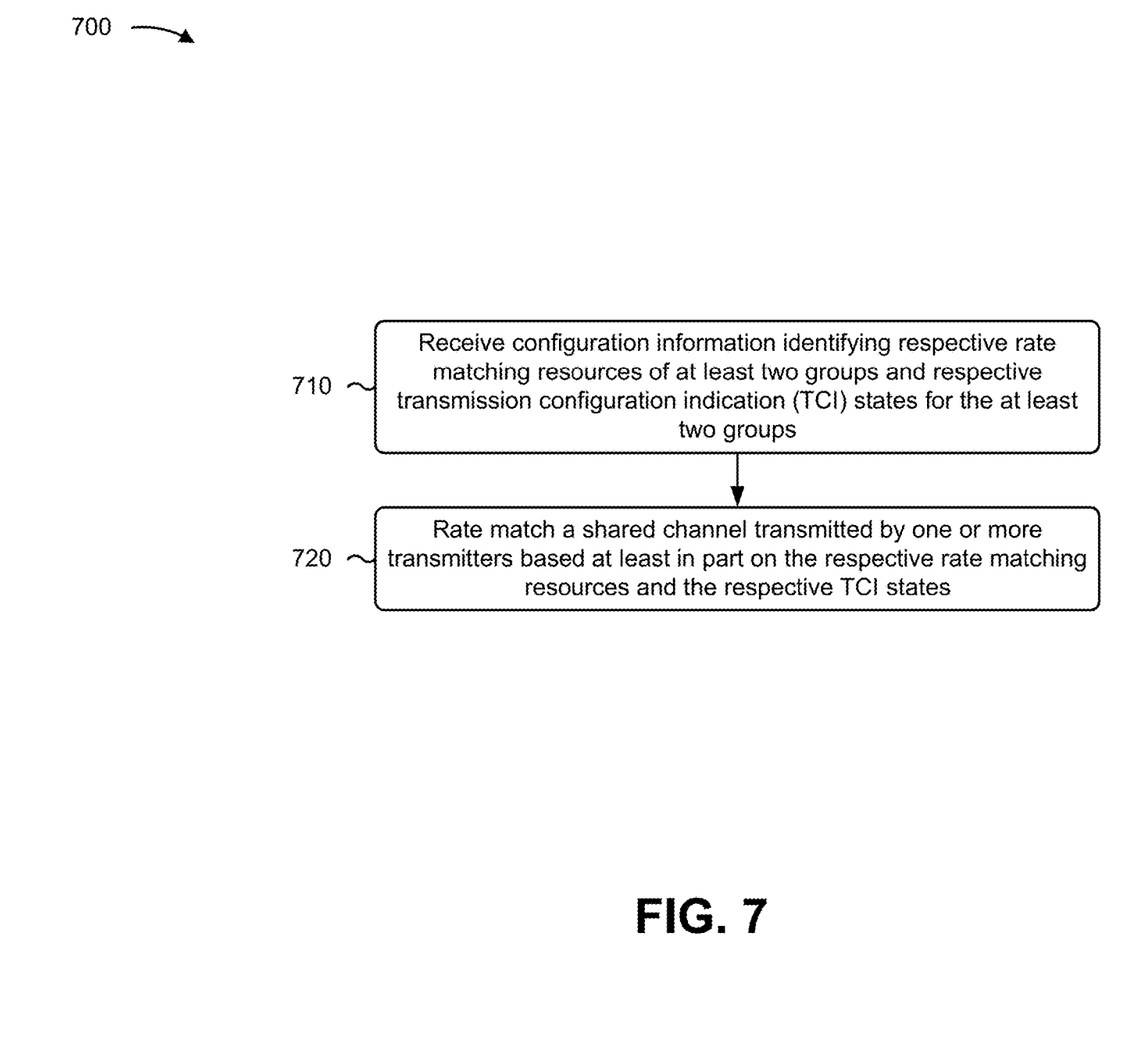
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120 and/or the like) performs operations associated with rate matching for multi-TRP communication.

As shown in FIG. 7, in some aspects, process 700 may include receiving configuration information identifying respective rate matching resources of at least two groups and respective TCI states for the at least two groups (block 710). For example, the UE (e.g., using antenna 252, DEMOD 254, MIMO detector 256, receive processor 258, controller/processor 280, and/or the like) may receive configuration information identifying respective rate matching resources of at least two groups and respective TCI states for the at least two groups, as described above.

As further shown in FIG. 7, in some aspects, process 700 may include rate matching a shared channel transmitted by one or more transmitters based at least in part on the respective rate matching resources and the respective TCI states (block 720). For example, the UE (e.g., using antenna 252, DEMOD 254, MIMO detector 256, receive processor 258, controller/processor 280, and/or the like) may rate match a shared channel transmitted by one or more transmitters based at least in part on the respective rate matching resources and the respective TCI states, as described above.

Process 700 may include additional aspects, such as any single aspect or any combination of aspects described below and/or in connection with one or more other processes described elsewhere herein.

In a first aspect, the respective TCI states include a respective plurality of TCI states for each group of the at least two groups.

In a second aspect, alone or in combination with the first aspect, each group, of the at least two groups, corresponds to a TRP.

In a third aspect, alone or in combination with one or more of the first and second aspects, the configuration information identifying the respective rate matching resources identifies at least one of: a zero-power channel state information reference signal resource set, a periodic rate matching pattern, a synchronization signal block, a cell-specific reference signal corresponding to transmission of a signal associated with a different radio access technology than the shared channel, a reference signal around which rate matching is to be performed, a rate matching pattern group, or a zero-power channel state information reference signal resource.

In a fourth aspect, alone or in combination with one or more of the first through third aspects, for a particular rate matching resource type, rate matching the shared channel comprises rate matching around all rate matching resources of the respective rate matching resources of the particular rate matching resource type of the at least two groups.

In a fifth aspect, alone or in combination with one or more of the first through fourth aspects, the UE may receive information indicating a single TCI state, of the respective TCI states, for the shared channel. In some aspects, rate matching the shared channel transmitted by the one or more transmitters further comprises rate matching the shared channel in accordance with the single TCI state and based at least in part on rate matching resources, of the respective rate matching resources, corresponding to a transmitter, of the one or more transmitters, associated with the single TCI state.

In a sixth aspect, alone or in combination with one or more of the first through fifth aspects, the information indicating the single TCI state is received in a TCI field of downlink control information.

In a seventh aspect, alone or in combination with one or more of the first through sixth aspects, the one or more transmitters comprise at least two transmitters associated with respective selected TCI states. In some aspects, the process 700 further comprises: receiving downlink control information indicating the respective selected TCI states, wherein the respective selected TCI states are selected from the respective TCI states associated with at least one corresponding group, of the at least two groups, corresponding to the at least two transmitters.

In an eighth aspect, alone or in combination with one or more of the first through seventh aspects, rate matching the shared channel transmitted by the at least two transmitters further comprises rate matching the shared channel around all rate matching resources, of the respective rate matching resources, associated with the at least one corresponding group associated with the at least two transmitters.

In a ninth aspect, alone or in combination with one or more of the first through eighth aspects, the at least one corresponding group is a single group associated with a single transmit receive point.

In a tenth aspect, alone or in combination with one or more of the first through ninth aspects, the at least one corresponding group includes two or more groups corresponding to respective transmit receive points.

In an eleventh aspect, alone or in combination with one or more of the first through tenth aspects, rate matching the shared channel transmitted by the at least two transmitters further comprises rate matching the shared channel around the respective rate matching resources corresponding to respective TRPs associated with the at least two transmitters, wherein the rate matching is performed separately for each of the at least two transmitters.

In a twelfth aspect, alone or in combination with one or more of the first through eleventh aspects, the shared channel is transmitted using respective spatial layers transmitted by the respective TRPs, wherein the rate matching is performed separately for the respective spatial layers.

In a thirteenth aspect, alone or in combination with one or more of the first through twelfth aspects, the shared channel is transmitted using respective resource block sets transmitted by the respective TRPs, wherein the rate matching is performed separately for the respective resource block sets.

In a fourteenth aspect, alone or in combination with one or more of the first through thirteenth aspects, the shared channel is transmitted using respective symbol sets transmitted by the respective TRPs, wherein the rate matching is performed separately for the respective symbol sets.

In a fifteenth aspect, alone or in combination with one or more of the first through fourteenth aspects, the shared channel includes a single codeword. In some aspects, a number of coded bits, of the single codeword, is calculated based at least in part on a number of resources of the single codeword per transmitter for each of the at least two transmitters. In some aspects, the number of resources of the single codeword per transmitter is calculated based at least in part on the corresponding rate matching resources that are not available for data.

In a sixteenth aspect, alone or in combination with one or more of the first through fifteenth aspects, the number of resources of the single codeword is calculated based at least in part on a number of spatial layers associated with the single codeword per transmitter and per resource of the resources.

In a seventeenth aspect, alone or in combination with one or more of the first through sixteenth aspects, the shared channel includes two or more codewords transmitted by respective transmitters of the one or more transmitters. In some aspects, a number of coded bits per codeword, of the two or more codewords, is based at least in part on respective numbers of resources of the two or more codewords. In some aspects, the respective numbers of resources of the two or more codewords are calculated based at least in part on the corresponding rate matching resources that are not available for data.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving configuration information identifying respective rate matching resources of at least two groups and respective transmission configuration indication (TCI) states for the at least two groups;
    receiving downlink control information (DCI) that includes a TCI field that indicates a single TCI state or multiple TCI states; and
    rate matching a shared channel transmitted by one or more transmitters based at least in part on the respective rate matching resources and one or more TCI states indicated by the TCI field.

2. The method of claim 1, wherein the one or more transmitters correspond to one or more transmit receive points.

3. The method of claim 1, wherein the one or more transmitters correspond to respective antenna panels of a transmit receive point.

4. The method of claim 1, wherein the one or more transmitters correspond to one or more TCI states associated with one or more respective beams.

5. The method of claim 1, wherein the respective TCI states include a respective plurality of TCI states for each group of the at least two groups.

6. The method of claim 1, wherein each group, of the at least two groups, corresponds to a transmit receive point.

7. The method of claim 1, wherein the respective rate matching resources are of a rate matching resource type including at least one of:
    a zero-power channel state information reference signal resource set,
    a periodic rate matching pattern,
    a synchronization signal block,
    a cell-specific reference signal corresponding to transmission of a signal associated with a different radio access technology than the shared channel,
    a reference signal around which rate matching is to be performed,
    a rate matching pattern group, or
    a zero-power channel state information reference signal resource.

8. The method of claim 1, wherein, for a particular rate matching resource type, rate matching the shared channel comprises rate matching around all rate matching resources of the respective rate matching resources of the particular rate matching resource type of the at least two groups.

9. The method of claim 1, further comprising:
    receiving information indicating the single TCI state for the shared channel, wherein rate matching the shared channel transmitted by the one or more transmitters further comprises:
        rate matching the shared channel in accordance with the single TCI state and based at least in part on rate matching resources, of the respective rate matching resources, corresponding to a transmitter, of the one or more transmitters, associated with the single TCI state.

10. The method of claim 9, wherein the information indicating the single TCI state is received in the TCI field.

11. The method of claim 1, wherein the one or more transmitters comprise at least two transmitters associated with respective selected TCI states, wherein the received DCI indicates the respective selected TCI states, and wherein the respective selected TCI states are selected from respective TCI states associated with at least one corresponding group, of the at least two groups, corresponding to the at least two transmitters.

12. The method of claim 11, wherein rate matching the shared channel transmitted by the at least two transmitters further comprises:

rate matching the shared channel around all rate matching resources, of the respective rate matching resources, associated with the at least one corresponding group associated with the at least two transmitters.

13. The method of claim 12, wherein the at least one corresponding group is a single group associated with a single transmit receive point.

14. The method of claim 12, wherein the at least one corresponding group includes two or more groups corresponding to respective transmit receive points.

15. The method of claim 11, wherein rate matching the shared channel transmitted by the at least two transmitters further comprises:

rate matching the shared channel around the respective rate matching resources corresponding to respective transmit receive points (TRPs) associated with the at least two transmitters, wherein the rate matching is performed separately for each of the at least two transmitters.

16. The method of claim 15, wherein the shared channel is transmitted using respective spatial layers transmitted by the respective TRPs, and wherein the rate matching is performed separately for the respective spatial layers.

17. The method of claim 15, wherein the shared channel is transmitted using respective resource block sets transmitted by the respective TRPs, and wherein the rate matching is performed separately for the respective resource block sets.

18. The method of claim 15, wherein the shared channel is transmitted using respective symbol sets transmitted by the respective TRPs, and wherein the rate matching is performed separately for the respective symbol sets.

19. The method of claim 15, wherein the shared channel includes a single codeword, wherein a number of coded bits, of the single codeword, is calculated based at least in part on a number of resources of the single codeword per transmitter for each of the at least two transmitters, and wherein the number of resources of the single codeword per transmitter is calculated based at least in part on the corresponding rate matching resources that are not available for data.

20. The method of claim 19, wherein the number of resources of the single codeword is calculated based at least in part on a number of spatial layers associated with the single codeword per transmitter and per resource of the resources.

21. The method of claim 15, wherein the shared channel includes two or more codewords transmitted by respective transmitters of the one or more transmitters, wherein a number of coded bits per codeword, of the two or more codewords, is based at least in part on respective numbers of resources of the two or more codewords, and wherein the respective numbers of resources of the two or more codewords are calculated based at least in part on the corresponding rate matching resources that are not available for data.

22. A user equipment (UE) for wireless communication, comprising:

a memory; and one or more processors coupled to the memory, the one or more processors configured to:

receive configuration information identifying respective rate matching resources of at least two groups and respective transmission configuration indication (TCI) states for the at least two groups;

receive downlink control information (DCI) that includes a TCI field that indicates a single TCI state or multiple TCI states; and rate match a shared channel transmitted by one or more transmitters based at least in part on the respective rate matching resources and one or more TCI states indicated by the TCI field.

23. The UE of claim 22, wherein the respective rate matching resources are of a rate matching resource type including at least one of:

a zero-power channel state information reference signal resource set, a periodic rate matching pattern, a synchronization signal block, a cell-specific reference signal corresponding to transmission of a signal associated with a different radio access technology than the shared channel, a reference signal around which rate matching is to be performed, a rate matching pattern group, or a zero-power channel state information reference signal resource.

24. The UE of claim 22, wherein, for a particular rate matching resource type, the one or more processors, to rate match the shared channel, are further configured to:

rate match around all rate matching resources of the respective rate matching resources of the particular rate matching resource type of the at least two groups.

25. The UE of claim 22, wherein the one or more processors are further configured to:

receive information indicating the single TCI state for the shared channel, and wherein the one or more processors, to rate match the shared channel transmitted by the one or more transmitters, are further configured to:

rate match the shared channel in accordance with the single TCI state and based at least in part on rate matching resources, of the respective rate matching resources, corresponding to a transmitter, of the one or more transmitters, associated with the single TCI state.

26. A non-transitory computer-readable medium storing one or more instructions for wireless communication, the one or more instructions comprising:

one or more instructions that, when executed by one or more processors of a user equipment (UE), cause the one or more processors to:

receive configuration information identifying respective rate matching resources of at least two groups and respective transmission configuration indication (TCI) states for the at least two groups;

receive downlink control information (DCI) that includes a TCI field that indicates a single TCI state or multiple TCI states; and rate match a shared channel transmitted by one or more transmitters based at least in part on the respective rate matching resources and one or more TCI states indicated by the TCI field.

27. The non-transitory computer-readable medium of claim 26, wherein the respective rate matching resources are of a rate matching resource type including at least one of:
   a zero-power channel state information reference signal resource set,
   a periodic rate matching pattern,
   a synchronization signal block,
   a cell-specific reference signal corresponding to transmission of a signal associated with a different radio access technology than the shared channel,
   a reference signal around which rate matching is to be performed,
   a rate matching pattern group, or
   a zero-power channel state information reference signal resource.

28. An apparatus for wireless communication, comprising:
   means for receiving configuration information identifying respective rate matching resources of at least two groups and respective transmission configuration indication (TCI) states for the at least two groups;
   means for receiving downlink control information (DCI) that includes a TCI field that indicates a single TCI state or multiple TCI states; and
   means for rate matching a shared channel transmitted by one or more transmitters based at least in part on the respective rate matching resources and one or more TCI states indicated by the TCI field.

29. The apparatus of claim 28, wherein the respective rate matching resources are of a rate matching resource type including at least one of:
   a zero-power channel state information reference signal resource set,
   a periodic rate matching pattern,
   a synchronization signal block,
   a cell-specific reference signal corresponding to transmission of a signal associated with a different radio access technology than the shared channel,
   a reference signal around which rate matching is to be performed,
   a rate matching pattern group, or
   a zero-power channel state information reference signal resource.

30. The apparatus of claim 28, wherein the one or more transmitters comprise at least two transmitters associated with respective selected TCI states,
   wherein the received DCI indicates the respective selected TCI states, and
   wherein the respective selected TCI states are selected from respective TCI states associated with at least one corresponding group, of the at least two groups, corresponding to the at least two transmitters.

* * * * *